Figure 1:
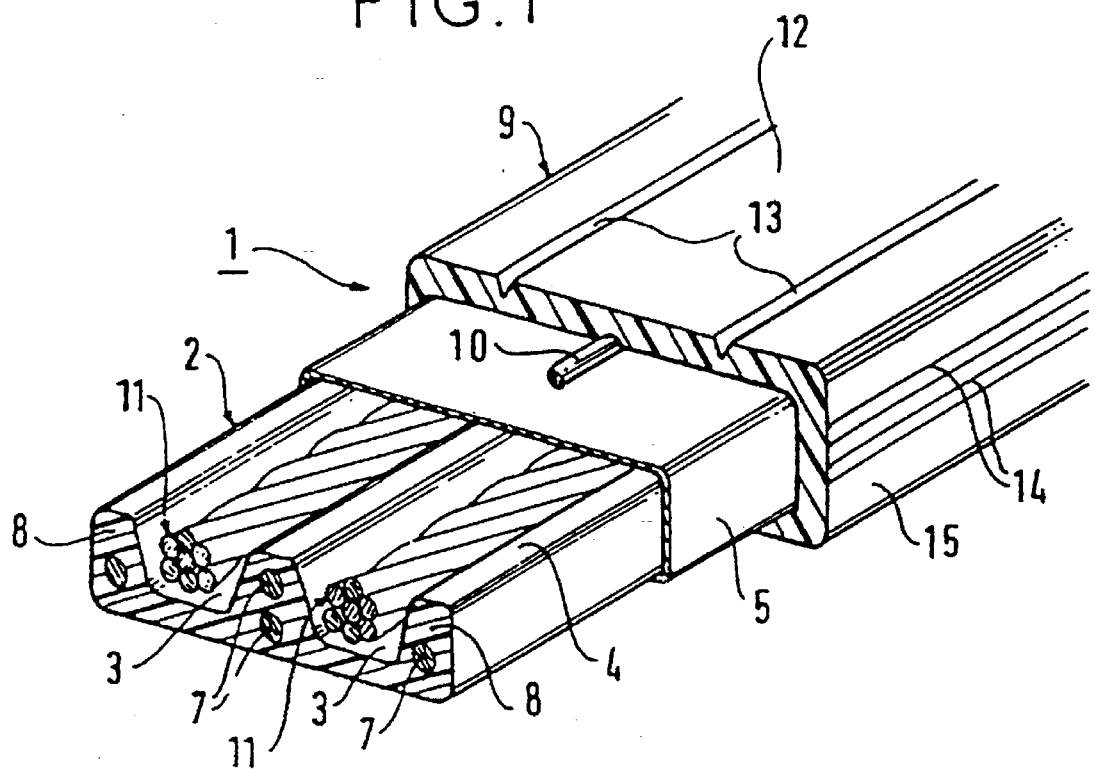

United States Patent [19]

Keller

[11] Patent Number: 5,668,912
[45] Date of Patent: Sep. 16, 1997

[54] RECTANGULAR OPTICAL FIBER CABLE

[75] Inventor: David A. Keller, Conover, N.C.

[73] Assignee: Alcatel NA Cable Systems, Inc., Claremont, N.C.

[21] Appl. No.: 598,178

[22] Filed: Feb. 7, 1996

[51] Int. Cl.⁶ .................................... G02B 6/44
[52] U.S. Cl. .................. 385/100; 385/114; 385/101; 385/110; 385/113
[58] Field of Search ............................. 385/100–114

[56] References Cited

U.S. PATENT DOCUMENTS

| | | | |
|---|---|---|---|
| 4,416,508 | 11/1983 | Dey et al. | 350/96.23 |
| 4,815,814 | 3/1989 | Ulijasz | 350/96.23 |
| 4,836,639 | 6/1989 | Shamoto et al. | 350/96.23 |
| 4,846,566 | 7/1989 | Barnett et al. | 350/96.23 |
| 4,904,321 | 2/1990 | Harvey | 350/96.23 |
| 5,082,380 | 1/1992 | Sutehall et al. | 385/110 |

*Primary Examiner*—John Ngo
*Attorney, Agent, or Firm*—Ware, Fressola, Van Der Sluys & Adolphson LLP

[57] ABSTRACT

The present invention relates to a sand [sic; cable] containing one or more elongated elements (11,21,22) for the transport of signals and/or electrical power, comprising an essentially flat support (2) made of a plastic material, including means for housing the elongated elements, characterized in that the housing means are in the form of at least one groove (3) which extends longitudinally along the flat support (2), all the grooves (3) being located on the same side (4) of the support (2), this support (2) being surrounded by a sheath (9) made of a plastic material.

36 Claims, 2 Drawing Sheets

RECTANGULAR OPTICAL FIBER CABLE

The present invention pertains to a cable containing at least one elongated element. The term "elongated element" is understood to refer to an optical fiber, a strip of optical fibers containing multiple optical fibers arranged next to each other, or an electrical conductor or a strand of electrical conductors.

The invention pertains to cables containing at least one such element, usually several, these elements being identical or different. For example, a cable according to the invention can contain at the same time optical fibers and electrical conductors. These cables are thus used either for the transmission of signals for any purpose (telecommunications, home automation, . . . ) or for the transport of power, or simultaneously for the transmission of signals and the transport of power.

To simplify the wiring of individual houses, buildings, or more generally areas which are difficult to access, attempts are currently being made to develop cables:

with high resistance to crushing so that they can be installed on the floor, at places subject to traffic or at places where heavy objects may be deposited, for example, ensuring easy access to the elements which they contain (optical fibers, electrical conductors, strips, . . . ) to make it possible to rapidly and easily make any required connections, bypasses, . . . , without the need to use specialized personnel, which are easy to install.

European Patent 0,280,279 describes a cable for strips of optical fibers, with circular cross section, which includes a support presenting, on its periphery, spiraled grooves which are intended to house each one or more strips of optical fibers. This support is surrounded by an external sheath made of a plastic material.

This cable is not satisfactory for meeting the above-mentioned criteria for the following reasons.

Once the cable is installed along a wall or in an adapted pipe, it is difficult to access the strips located on the unexposed side (the side against the wall).

Moreover, this cable is difficult to close once one has gained access to the strips to make a connection, for example, because of the helicoidal arrangement of the housing grooves.

Because of the circular cross section of the cable, a crushing force applied to the cable acts practically at only one point of this section. Thus, to preserve an adequate protection for the elements contained in the support, its rigidity must be increased, using for that purpose a material with a very high resistance to crushing. Therefore it is difficult to fold the cable in order to install it in places which are difficult to access.

Finally, this cable cannot be attached in the pipes or along walls by means of simple conventional "staples" adapted to elements which have an essentially rectangular cross section.

Moreover, European Patent No. 0,259,051 describes a flat cable (that is one which has an essentially rectangular cross section, having at least two essentially flat opposing sides) with optical fibers including several tubes for protection each containing one optical fiber, these tubes being inserted in a flat support in a plastic material.

This cable also raises several problems.

First, the flat support made of plastic must be made of a material which has a sufficiently low modulus of elasticity so that it can easily be unsheathed during access to the fibers. Consequently, the resistance to crushing is low, and, in this regard, the cable does not satisfy the criterion established above.

Moreover, the use of protection tubes prevents easy access to the fibers and, notably, access can only be gained by persons who are relatively qualified, and thus repair or routine operations are complex.

Finally, the integrity of the cable cannot be preserved once access to the fibers has been gained, because the flat support of tubes had to be torn for that purpose. Their replacement is complex, and it cannot be performed by an unqualified person. Therefore, it appears that none of the known types of cable simultaneously meets all the required criteria.

One purpose of the present invention is therefore to provide a cable containing elongated elements, such as optical fibers, strips with optical fibers, electrical conductors or a strand of electrical conductors, which meets all these criteria.

The present invention proposes for this purpose a cable containing one or more elongated elements, for the transport of signals and/or electrical energy, which comprises a support made of a plastic material, which is essentially flat and comprises means for housing said elongated elements, characterized in that said housing means are in the form of at least one groove extending longitudinally along said flat supports, all the grooves being located on the same side of said support, said support being surrounded by a sheath made of plastic material.

The flat support of the cable according to the invention can be made of a material with high resistance to crushing, that is with a relatively high modulus of elasticity, since it does not have to be torn to allow access to the elements contained in the cable; the modulus of elasticity of the material which constitutes the support can in addition be sufficiently low to allow the support to be folded when necessary for the convenience of the installer, since the crushing forces are distributed over a line in each section, because of the flat cross section of the cable.

Moreover, thanks to its relative rigidity, the cable according to the invention can be easily introduced "blind" in pipes or in series of openings for its installation.

Thus, since it is the flat support which withstands the crushing forces, the sheath can consist of a material with low modulus of elasticity, so that it can easily be unsheathed.

Since the grooves are all located on the same side of the support, the access to the elongated elements is always easy: it is sufficient to place the cable so that the side opposite to the side which bears the grooves is located against the wall.

It is not necessary to provide protection tubes.

Moreover, the integrity can be preserved better than in the flat cables of the prior art because the exterior sheath which has been eliminated to allow access to the elongated elements can easily be replaced by a strip or a portion of a tube (for example, to be swaged at high temperature) which is slipped over the desired place.

The installation can be done by means of conventional "staples" for cables with a rectangular cross section; hence, there is greater simplicity of installation by unqualified personnel.

Finally, the cable according to the invention is easy to remove because the grooves do not have a helicoidal configuration.

Advantageously, the sheath can consist of a material with a lower modulus of elasticity than the material constituting the support.

Optionally, one or more mechanical reinforcing elements can be inserted in the support to increase its rigidity.

According to an additional characteristic, the sheath can present, on its exterior side, visual signs which allow the identification of the side of the cable through which the grooves containing the elongated elements can be accessed. These visual signs can include, for example, V grooves provided in the sheath, which also serve to weaken the sheath at certain places to facilitate the unsheathing of the cable, or indications made on the sides of the sheath in the vicinity of the groove(s) containing one or more of the specific elongated elements, in particular to identify the latter.

The cable according to the invention can also contain, between the sheath and the support, at least one cord which extends beyond the extremity of the cable and which is intended to facilitate the tearing of the sheath to unsheath the cable.

The support can, for example, consist of a material having a modulus of elasticity between 3,000 and 10,000 psi, such as PVC, polypropylene, polyethylene or nylon. Optionally, the material selected for the support can have flame-retarding properties.

The sheath can consist, for example, of a material having a modulus of elasticity between 1,000 and 3,000 psi, such as polypropylene, PVC or polyethylene. Again, the material used can have flame-retarding properties.

Other characteristics and advantages of the present invention will become apparent in the following description of several embodiments of the cable according to the invention which are given as illustrations and which are in no way limiting.

Figure 2:
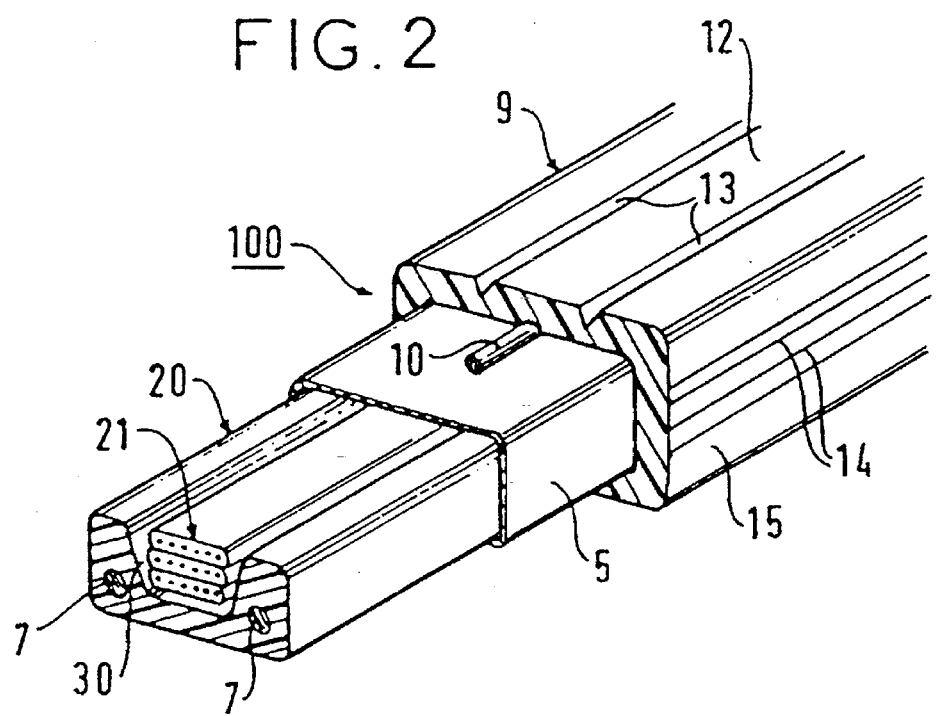
Figure 3:
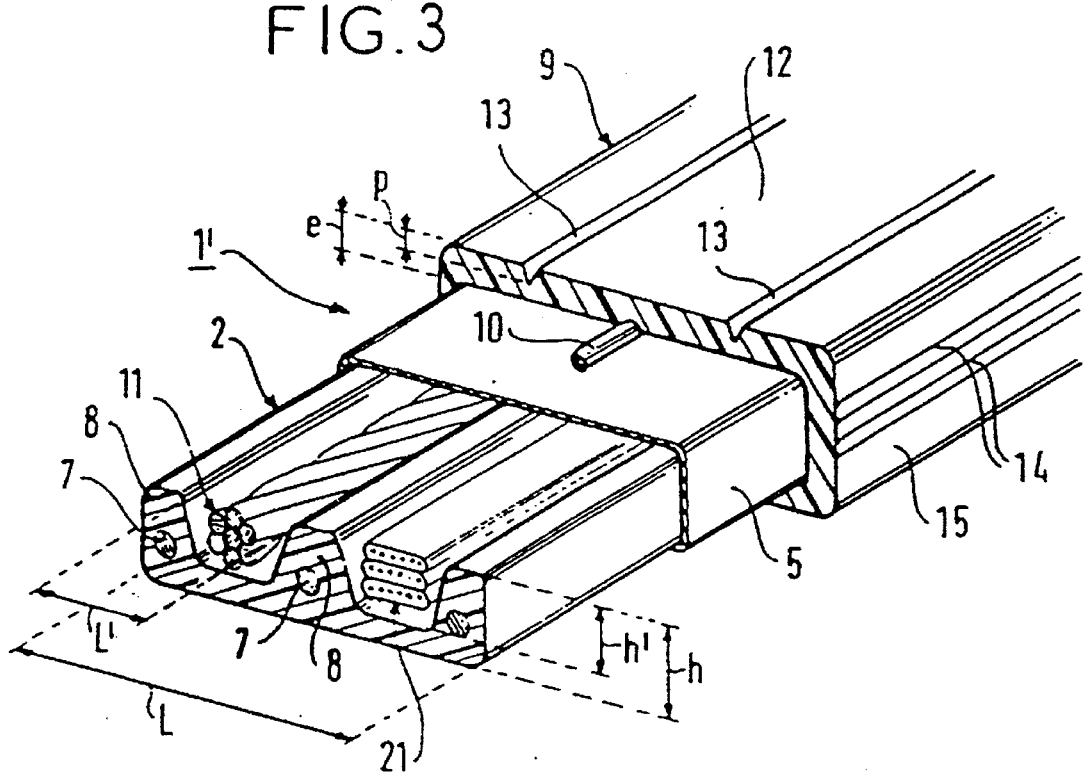
Figure 4:
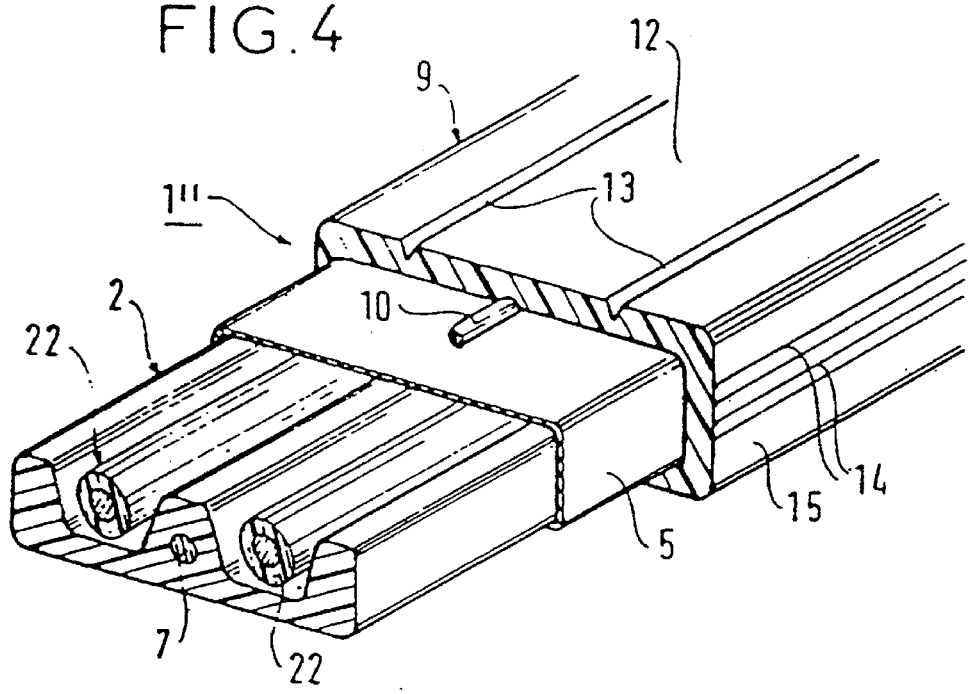

In the following figures:

FIG. 1 is a partially cutaway perspective view of a cable according to the invention in a first variant, FIG. 2 is a partially cutaway perspective view of a cable according to the invention in a second variant, FIG. 3 is a partially cutaway perspective view of a cable according to the invention in a third variant, FIG. 4 is a partially cutaway perspective view of a cable according to the invention in a fourth variant.

In all these figures, identical elements have the same reference numbers.

FIG. 1 shows a cable 1 according to the invention which comprises:

an essentially flat support with a rectangular cross section 2, made of an insulating material such as PVC, polyethylene, nylon or polypropylene, presenting two longitudinal grooves 3 provided at the level of its top side 4, a strip 5 made of a metallic or dielectric material, such as mylar, with coating on the lower side 6 of the support 2, surrounding the support 2, several reinforcing elements 7 (for example, four in FIG. 1), made of metal, for example, or of glass fiber, aramid, or other materials, extending longitudinally along the support 2 and embedded in the latter at the level of each edge 8 defining the grooves 3, a protective sheath 9 made of a material with low modulus of elasticity, less than that of the material constituting the support 2, for example, polypropylene, polyethylene or PVC, surrounding the strip 5, two strands of electrical conductors 11, each located in a groove 3, the conductors being optionally maintained together by means of a thread (not shown), stripping cord 10 which extends beyond one of the ends of the cable 1, and which is introduced between the sheath 9 and the strip 5 to facilitate the removal of the sheath 9 when accessing one of the strands of conductors 11.

Moreover, the sheath 9 presents on its top side 12 two V grooves 13, each located perpendicularly with respect to one of the grooves 3 to allow, at the same time, the identification of the latter, and thus of the elements 11 which they contain, while the cable 1 is closed, and to form weakened points in the sheath 9 facilitating the unsheathing.

Sheath 9 also presents, on one or more of its sides, at appropriate places, visual signs such as the lines 14 traced on one of the lateral sides 15 of the sheath 9, used to identify one or more specific elements of the cable 1.

Naturally, in the cable 1, the strands of conductors 11 can be replaced by an elongated element, for example, by optical fibers, strips of optical fibers or simple electrical conductors.

The difference between cable 100 of FIG. 2 and cable 1 is that the support 20 contains only a single groove 30, and the latter contains a stack of several strips with optical fibers 21, three in FIG. 2.

Here the strips 21 of optical fibers can again be replaced, for example, by optical fibers or electrical conductors.

In cable 1' of FIG. 3, the difference compared to FIG. 1 resides in the fact that one of the grooves 3 contains a strand of electrical conductors 11, and the other a stack of three strips of optical fibers 21.

Finally, the difference between cable 1" of FIG. 4 and FIG. 1 resides in the fact that each of the grooves 3 contains a single insulated electrical conductor 22 (the conductors 22 can also be uninsulated). Instead of the conductors 22, the grooves 3 can each contain one optical fiber, or one of the grooves 3 contains an optical fiber and the other an insulated or uninsulated conductor.

In all these variants, the material which constitutes the sheath 10 can be fire-resistant and/or resistant to the penetration of water, depending on the application of the cable according the invention and the place where it is intended to be installed.

The dimensions of the different elements of the cable according to the invention can be, for example, as follows (in particular, for the variants represented in FIG. 1, but also for all the other variants):

width L of the support 2: approximately 10 mm, height h of the support 2: approximately 2.5 mm, width L' of the grooves 3: approximately 3.5 mm, height h' of the grooves 3: approximately 1.5 mm, thickness e of the sheath 9: 0.5–1 mm, thickness of the strip 5: 0.025–0.05 mm, width (edge-to-edge distance) of the strip 5: 1–3.5 mm, depth p of the grooves: 0.25–0.5 mm (half the thickness of the sheath).

Besides the above-indicated advantages, the cable according to the invention additionally presents the following advantages:

it is inexpensive to make and install, and thus is particularly suitable for private domestic use, it takes up less space than a cable with circular cross section of identical content; in fact, to house, for example, a strip of optical fibers with a given width 1 in a groove provided in the periphery of a cable with a circular cross section, the diameter of this cable must be amply greater than 1, whereas to house such a strip in a groove of a flat cable according to the invention, a width which is slightly larger than 1 is necessary.

Naturally, the present invention is not limited to the embodiments which have just been described.

The elongated elements contained in the cable can also be left free in the grooves, or they can be attached to each other.

The grooves can also be filled with a material which stops the penetration of water, such as a thixotropic gel (which liquefies when stirred) or a water-absorbing powder.

In all the variants of the cable according to the invention, and in particular in those where the cable contains only elements for the transmission of signals, the reinforcing elements 7 can be replaced by electrical conductors which may possibly be also used for reinforcement, when necessary. In this case, it will be preferable not to have to access the electrical conductors.

Finally, any means can be replaced by equivalent means without deviating from the scope of the invention.

What is claimed is:

1. A flat slotted core cable comprising:
   a cable jacket;
   a slotted frame arranged inside said cable jacket, having at least one slot and having at least one strength member embedded therein;
   at least one fiber arranged in said slot; and
   one or more rip cords being embedded either in the cable jacket, or under the cable jacket, to be located between V-shaped grooves to facilitate quick removal of the cable jacket.

2. A flat slotted core cable according to claim 1, wherein said slotted frame has an edge containing either a dielectric strength member, a non-electric strength member or an electrical conductor.

3. A flat slotted core cable according to claim 1, wherein said fiber includes optical fibers, and conductors manufactured in a ribbon either laid loose therein, stranded in a bundle, or bound in a bundle by thread.

4. A flat slotted core cable according to claim 1, wherein said at least one slot is shaped to house said fiber.

5. A flat slotted core cable according to claim 1, wherein said slotted frame has a center containing one or more of said strength members.

6. A flat slotted core cable according to claim 1, wherein said strength members include dielectric strength members, non-dielectric strength members, electrical conductors or a combination thereof.

7. A flat slotted core cable according to claim 1, further comprising tape wrapped around the slotted frame of dielectric or metal material, having an overlap on the side opposite the slots.

8. A flat slotted core cable according to claim 1, wherein the cable jacket has a rectangular jacket surface with one side containing profile lined to designate a specific location of a slot side.

9. A flat slotted core cable according to claim 1, wherein said at least one slot is left void of either water blocking material, filled with thixotropic water blocking gel or dusted with water absorbent material to house optical fibers, and conductors manufactured in a ribbon either laid loose therein, stranded in a bundle, or bound in a bundle by thread.

10. A flat slotted core cable comprising:
    a cable jacket;
    a slotted frame arranged inside said cable jacket, having at least one slot and having at Least one strength member embedded therein: and
    at least one fiber arranged in said slot;
    wherein the cable jacket is weather resistant and contains two profile extruded V grooves to facilitate easy access to the optical fibers and to denote an access side to optical fibers.

11. A flat slotted core cable according to claim 10, wherein said slotted frame has an edge containing either a dielectric strength member, a non-dielectric strength member or an electrical conductor.

12. A flat slotted core cable according to claim 10, wherein said fiber includes optical fibers, and conductors manufactured in a ribbon either laid loose therein, stranded in a bundle, or bound in a bundle by thread.

13. A flat slotted core cable according to claim 10, wherein said at least one slot is shaped to house said fiber.

14. A flat slotted core cable according to claim 10, wherein said slotted frame has a center containing one or more of said strength members.

15. A flat slotted core cable according to claim 10, wherein said strength members include dielectric strength members, non-dielectric strength members, electrical conductors or a combination thereof.

16. A flat slotted core cable according to claim 10, further comprising tape wrapped around the slotted frame of dielectric or metal material, having an overlap on the side opposite the slots.

17. A flat slotted core cable according to claim 10, wherein the cable jacket has a rectangular jacket surface with one side containing profile lined to designate a specific location of a slot side.

18. A flat slotted core cable according to claim 10, wherein said at least one slot is left void of either water blocking material, filled with thixotropic water blocking gel or dusted with water absorbent material to house optical fibers, and conductors manufactured in a ribbon either laid loose therein, stranded in a bundle, or bound in a bundle by thread.

19. A flat slotted core cable comprising:
    a cable jacket;
    a slotted frame arranged inside said cable jacket, having at least one slot and having at least one strength member embedded therein; and
    at least one fiber arranged in said slot;
    wherein the cable jacket has V grooves and profile lines that indicate to an installer an exact location of which side of the flat slotted core cable a particular fiber, fibers or ribbon is located for a particular product description.

20. A flat slotted core cable according to claim 19, wherein said slotted frame has an edge containing either a dielectric strength member, a non-dielectric strength member or an electrical conductor.

21. A flat slotted core cable according to claim 19, wherein said fiber includes optical fibers, and conductors manufactured in a ribbon either laid loose therein, stranded in a bundle, or bound in a bundle by thread.

22. A flat slotted core cable according to claim 19, wherein said at least one slot is shaped to house said fiber.

23. A flat slotted core cable according to claim 19, wherein said slotted frame has a center containing one or more of said strength members.

24. A flat slotted core cable according to claim 19, wherein said strength members include dielectric strength members, non-dielectric strength members, electrical conductors or a combination thereof.

25. A flat slotted core cable according to claim 19, further comprising tape wrapped around the slotted frame of dielectric or metal material, having an overlap on the side opposite the slots.

26. A flat slotted core cable according to claim 19, wherein the cable jacket has a rectangular jacket surface with one side containing profile lined to designate a specific location of a slot side.

27. A flat slotted core cable according to claim 19, wherein said at least one slot is left void of either water blocking material, filled with thixotropic water blocking gel or dusted with water absorbent material to house optical fibers, and conductors manufactured in a ribbon either laid loose therein, stranded in a bundle, or bound in a bundle by thread.

28. A flat slotted core optical/electrical cable, comprising:
a cable jacket;
a slotted frame arranged inside the cable jacket, having a plurality of slots and having at least one strength member embedded therein;
a fiber for transmission of an, optical signal being arranged in one of the plurality of slots; and
a conductor for transmission of an electrical signal being arranged in a different one of the plurality of slots.

29. A flat slotted core optical/electrical cable according to claim 28, wherein said slotted frame has an edge containing either a dielectric strength member, a non-dielectric strength member or an electrical conductor.

30. A flat slotted core optical/electrical cable according to claim 28, wherein the optical fiber includes optical fibers manufactured in a ribbon either laid loose therein, stranded in a bundle, or bound in a bundle by thread.

31. A flat slotted core optical/electrical cable according to claim 28, wherein said one of the plurality of slots is shaped to house said fiber.

32. A flat slotted core optical/electrical cable according to claim 28, wherein said slotted frame has a center containing one or more of said strength members.

33. A flat slotted core optical/electrical cable according to claim 28, wherein said strength members include dielectric strength members, non-dielectric strength members, electrical conductors or a combination thereof.

34. A flat slotted core optical/electrical cable according to claim 28, further comprising tape wrapped around the slotted frame of dielectric or metal material, having an overlap on the side opposite the slots.

35. A flat slotted core optical/electrical cable according to claim 28, wherein the cable jacket has a rectangular jacket surface with one side containing profile lined to designate a specific location of a slot side.

36. A flat slotted core optical/electrical cable according to claim 28, wherein one of the plurality of slots is left void of either water blocking material, filled with thixotropic water blocking gel or dusted with water absorbent material to house optical fibers manufactured in a ribbon either laid loose therein, stranded in a bundle, or bound in a bundle by thread.

* * * * *

UNITED STATES PATENT AND TRADEMARK OFFICE
CERTIFICATE OF CORRECTION

PATENT NO. : 5,668,912
DATED : September 16, 1997
INVENTOR(S) : David A. Keller

It is certified that error appears in the above-identified patent and that said Letters Patent is hereby corrected as shown below:

- Column 5, Line 59, Claim 10, "Least" should be --least--;

- Column 5, Claim 10, Line 60, ":" should be --;--.

Signed and Sealed this

Third Day of February, 1998

Attest:

BRUCE LEHMAN

Attesting Officer

Commissioner of Patents and Trademarks